United States Patent
Schumann et al.

(10) Patent No.: US 10,942,853 B2
(45) Date of Patent: Mar. 9, 2021

(54) SYSTEM AND METHOD INCLUDING BROADCASTING AN ADDRESS TRANSLATION INVALIDATION INSTRUCTION WITH A RETURN MARKER TO INDENTIFY THE LOCATION OF DATA IN A COMPUTING SYSTEM HAVING MUTIPLE PROCESSORS

(71) Applicant: International Business Machines Corporation, Armonk, NY (US)

(72) Inventors: John A. Schumann, Austin, TX (US); Debapriya Chatterjee, Austin, TX (US); Bryant Cockcroft, Austin, TX (US); Lawrence Leitner, Austin, TX (US); Karen Yokum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/227,437

(22) Filed: Dec. 20, 2018

(65) Prior Publication Data
US 2020/0201767 A1 Jun. 25, 2020

(51) Int. Cl.
*G06F 12/0831* (2016.01)
*G06F 13/00* (2006.01)
(Continued)

(52) U.S. Cl.
CPC ...... *G06F 12/0833* (2013.01); *G06F 12/0891* (2013.01); *G06F 12/1045* (2013.01); *G06F 2212/683* (2013.01)

(58) Field of Classification Search
CPC ............. G06F 12/0833; G06F 12/0891; G06F 12/1045; G06F 2212/683; G06F 13/00
See application file for complete search history.

(56) References Cited

U.S. PATENT DOCUMENTS

| | | | |
|---|---|---|---|
| 6,119,204 A * | 9/2000 | Chang | G06F 12/1027 711/141 |
| 9,772,945 B1 * | 9/2017 | Frey | G06F 12/0811 |

(Continued)

*Primary Examiner* — Tuan V Thai
(74) *Attorney, Agent, or Firm* — Scully, Scott, Murphy & Presser, P.C.

(57) ABSTRACT

A method, computer program product, and computer system are disclosed that in one or more embodiments includes issuing, from an issuing processor in the computer system, an address translation invalidation instruction with a return marker, wherein the address translation invalidation instruction is to invalidate one or more address translation entries in one or more storage locations in the computer system and wherein the return marker comprises an instruction to return information to the issuing processor indicating the identity of each processor where an invalidated entry was located. The method, product, and system in an embodiment further includes broadcasting the address translation invalidation instruction with the return marker to one or more storage locations of one or more of the processors in the computer system other than the issuing processor; invalidating the address translation entry corresponding to the broadcasted address translation invalidation instruction; and returning to the issuing processor information on each storage location corresponding to the invalidated address translation entry. In one or more embodiments, the returned information is used to determine the performance of the computing system, identifying the storage locations where data was located.

20 Claims, 3 Drawing Sheets

(51) Int. Cl.
*G06F 12/0891* (2016.01)
*G06F 12/1045* (2016.01)

(56) References Cited

U.S. PATENT DOCUMENTS

| | | | |
|---|---|---|---|
| 2008/0140897 A1* | 6/2008 | Ganguly | G06F 12/1027 |
| | | | 710/268 |
| 2014/0164731 A1* | 6/2014 | Muff | G06F 12/1027 |
| | | | 711/206 |
| 2015/0242319 A1* | 8/2015 | Evans | G06F 12/1045 |
| | | | 711/207 |
| 2016/0140042 A1* | 5/2016 | Mukherjee | G06F 12/0891 |
| | | | 711/123 |
| 2016/0170886 A1 | 6/2016 | Ma et al. | |
| 2017/0161209 A1 | 6/2017 | Bussa et al. | |
| 2017/0177501 A1* | 6/2017 | Guthrie | G06F 9/30043 |
| 2017/0228320 A1 | 8/2017 | Malyugin et al. | |

* cited by examiner

SYSTEM AND METHOD INCLUDING BROADCASTING AN ADDRESS TRANSLATION INVALIDATION INSTRUCTION WITH A RETURN MARKER TO INDENTIFY THE LOCATION OF DATA IN A COMPUTING SYSTEM HAVING MUTIPLE PROCESSORS

BACKGROUND

This disclosure herein relates generally to processors, and more particularly, to methods, apparatus, and products for identifying the location of data within a computer.

A conventional computer typically includes multiple processors capable of storing various types of data, such as data used to translate virtual addresses to physical addresses. The data may be widely distributed and stored on various processors throughout the computer. However, the computer may incur a decrease in performance if a processor needs to use data that is not stored locally but is rather stored on another processor. That is, the latency in processing the data increases when the processor needs to retrieve data from another processor. Moreover, as the data is widely distributed throughout the computer, a software programmer may not know how the data is distributed, for example, on which processor the data is located or in how many different places the data is stored, in order to optimally retrieve the data to avoid performance costs.

SUMMARY

The summary of the disclosure is given to aid understanding of a computer system, computer architectural structure, processor, and method of identifying the location of data within a computer to improve processor performance, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In one or more embodiments, a method of processing information in a processor of a computer system includes issuing, from one of a plurality of processors, an address translation instruction with a return marker. In one or more aspects, the address translation invalidation instruction invalidates one or more address translation entries in one or more storage locations in the computer system. In one or more embodiments, the method includes broadcasting the address translation invalidation instruction to one or more storage locations of one or more of the other processors. In one or more embodiments, the method includes invalidating an address translation entry located in a storage location of the one or more storage locations. In one or more embodiments, the method includes returning information on the invalidated address translation entry to the issuing processor.

In one or more embodiments, a computer program product includes a non-transitory computer-readable storage medium having program instructions embodied thereon. In one or more aspects, the program instructions are executable by one or more processors. The program instructions, in one or more embodiments, when executed by a processor, cause an address translation invalidation instruction with a return marker to issue from one or more processors of a computing system. In one or more aspects, the address translation invalidation instruction when executed by the processor causes one or more address translation entries in one or more storage locations in the computer system to be invalidated. The program instructions, in one or more embodiments, include instructions that when executed by a processor cause the address translation invalidation instruction to be broadcast to one or more storage locations of one or more of the other processors. The program instructions, in one or more embodiments, include instructions that when executed by a processor cause an address translation entry corresponding to a storage location of the one or more storage locations to be invalidated. The program instructions, in one or more embodiments, include instructions that when executed by a processor cause information on the invalidated address translation entry to be returned to the issuing processor.

In one or more embodiments, an information handling system comprises one or more processors. In one or more embodiments, one of the one or more processors is configured to issue an address translation invalidation instruction with a return marker. In one or more embodiments, the address translation invalidation instruction invalidates one or more address translation entries in one or more storage locations in the computer system. In one or more embodiments, the processor is further configured to broadcast the address translation invalidation instruction to one or more storage locations of one or more of the other processors. In one or more embodiments, one or more of the other processors is/are configured to invalidate an address translation entry located in a storage location of the one or more storage locations. In one or more embodiments, the one or more of the other processors is further configured to return information on the invalidated address translation entry to the issuing processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, subassemblies, systems, embodiments, methods, processes, or devices shown, and the arrangements, structures, assemblies, subassemblies, systems, features, aspects, methods, processes, embodiments, and devices shown may be used singularly or in combination with other arrangements, structures, assemblies, subassemblies, systems, features, aspects, embodiments, methods, processes, and devices.

DETAILED DESCRIPTION

Figure 1:
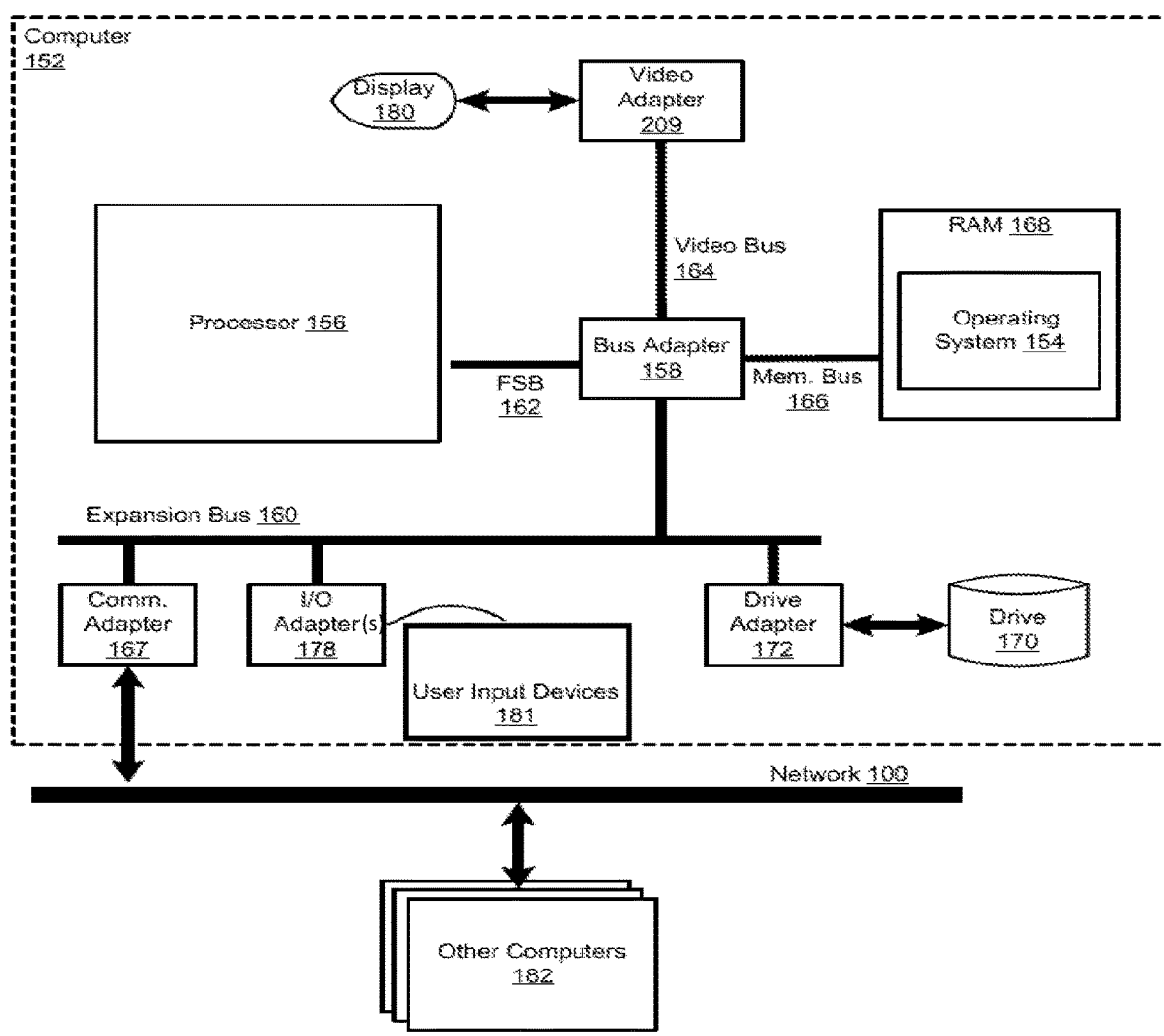
FIG. 1 is a functional block diagram illustrating a computer system, according to one or more embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those of ordinary skill in the art that different and numerous embodiments of the computer system, computer architectural structure, processor, and their method of operation may be practiced without those specific details, and the claims and disclosure should not be limited to the embodiments, arrangements, assemblies, subassemblies, systems, features, processes, methods, aspects, devices, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information handling systems, including processors and microprocessor systems and architectures, which are apparent to those of ordinary skill in the art. It is assumed that those skilled in the art are familiar with the general architecture of processors, and in particular, with processor design verification. It may be noted that a numbered element is numbered according to the figure in which the element is introduced, and is typically referred to by that number throughout succeeding figures.

In complex computer systems, data is shared and cached throughout the system. There is a performance cost to using data that is not cached locally on a microprocessor. It is, however, difficult to know where the data is located and in how many different places it has been cached. Knowing how data is distributed through the system can be used to improve system performance. Exemplary methods, apparatus, systems, and products for identifying the location of data within a computer system to improve performance of one or more processors in accordance with the present disclosure are described further below with reference to the Figures. In one or more embodiments, an address translation invalidation instruction is executed and broadcast throughout the system to return information about where and how many times an invalidation occurred which will inform where data was located in the system. In one or more embodiments, the data regarding the address translation invalidation is accumulated and returned to the issuing processor core where it is collected by a performance monitor unit (PMU). The information returned to the issuing processor can be accessed and analyzed.

FIG. 1 is a functional block diagram illustrating a computer system 10. The system 10 includes an example of automated computing machinery in the form of a computer 152.

Figure 2:
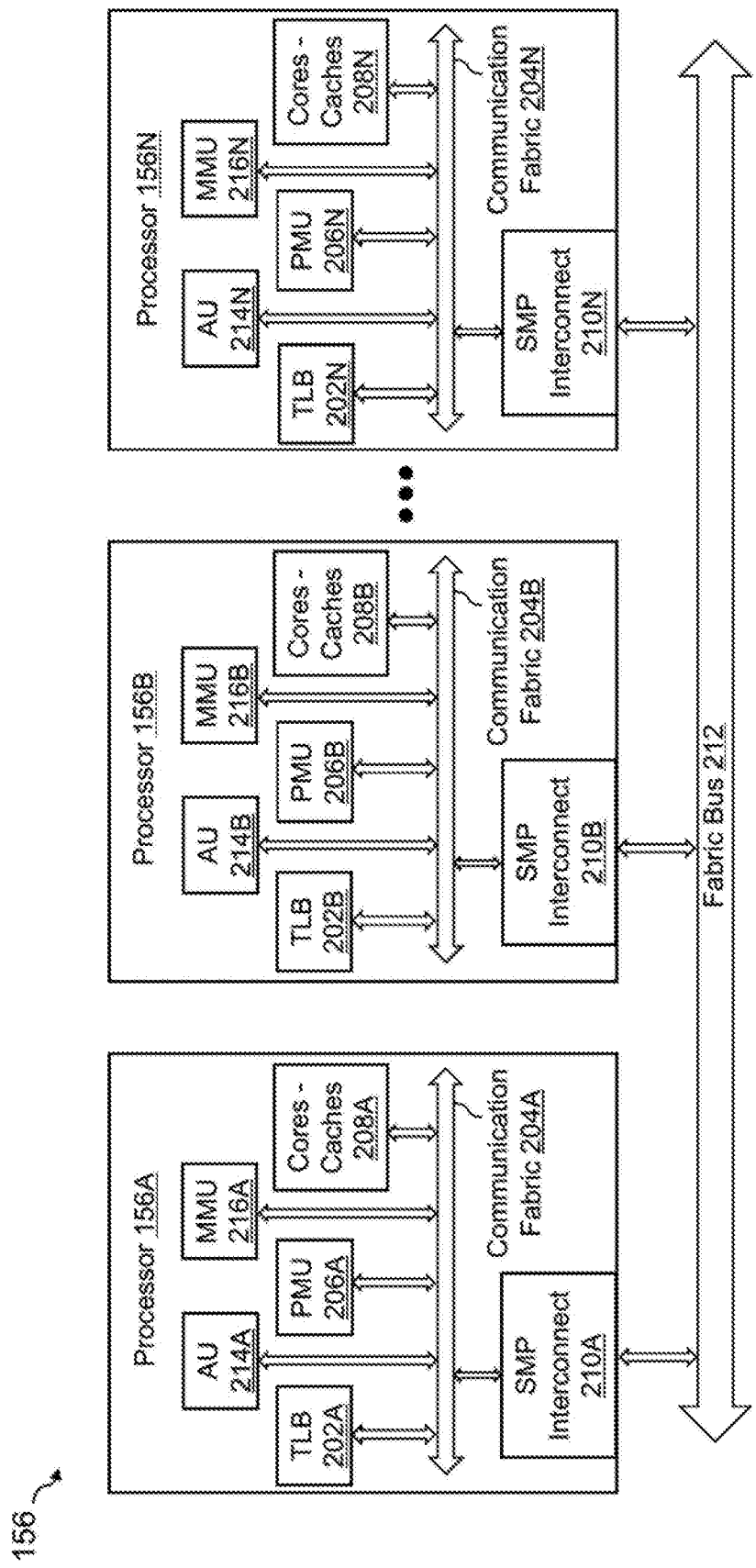
FIG. 2 is a functional block diagram illustrating a processor configured to perform processing instructions, according to one or more embodiments of the present disclosure.

The computer 152 may include a processor 156 or central processing unit ("CPU") as well as random access memory 168 ("RAM"), which is connected via a high speed memory bus 166 and bus adapter 158 to the processor 156 and to other components of the computer 152. For simplicity, FIG. 1 illustrates only one processor 156 included with the computer 152; however, it is noted that computer 152 may include more than one processor, for example, processor 156A, processor 156B, through processor 156N (where N can be any number), as illustrated in FIG. 2. It is noted that processor 156A, processor 156B, through processor 156N each include one or more aspects of processor 156. In some embodiments, RAM 168 may be an embedded dynamic random access memory (eDRAM). In some embodiments, RAM 168 may be utilized by units, such as processing cores, on the processor 156, via the front side bus 162 and/or the fabric bus 212 (FIG. 2).

The processor 156 may be implemented as a multi-slice processor. The term "multi-slice" may refer to a processor having a plurality of similar or identical sets of components, where each of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an example implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™ Linux™, Microsoft Windows™, AIX™, IBM's z/OS™, and others known to those of ordinary skill in the art. In addition to the operating system 154 and the data processing application being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer. The disk drive adapter 172 may connect to non-volatile data storage 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also include a PCI Express adapter.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as Internet Protocol (IP) data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

FIG. 2 is a functional block diagram illustrating processor 156, represented as multiple processors 156A, 156B, through 156N (where N can be any number), configured to process instructions, and in particular, to practice embodiments of the disclosure that identify the location of data within a computer to improve processor performance. For purpose of clarity, the of the disclosure illustrated in FIG. 2 are described with respect to the processor 156A. However, this discussion is not intended to be limiting or restrictive to only the features of processor 156A and its respective multiple units; but rather, all or some features and/or multiple units of processor 156A may be equally applicable to processor 156B through processor 156N, and their respective multiple units. For example, the features of communication fabric 204A may be included in each of communication fabric 204B and communication fabric 204N.

In one or more embodiments, processor 156A includes multiple units, such as, a translation lookaside buffer ("TLB") 202A, a performance management monitoring unit ("PMU") 206A, one or more cores and/or caches 208A, a symmetric multiprocessing ("SMP") interconnect 210A, an accelerator unit ("AU") 214A, and a memory management unit ("MMU") 216A, each being coupled to communication fabric 204A. In one or more embodiments, the processor 156A also includes a segment lookaside buffer ("SLB") (not shown) and/or an in use scoreboard ("IUSB") (not shown). The communication fabric 204A is configured to transmit messages, e.g., signals, information, etc., between the units, connectors, and storage on processor 156A. In one or more embodiments, the TLB 202A, the PMU 206A, the one or more cores and/or caches 208A, the SMP interconnect 210A, communication fabric 204A, the AU 214A, and the MMU 216A are implemented on the same semiconductor die or on multiple interconnected dies. In one or more aspects, the SLB and the IUSB are coupled to the one or more other multiple units of the processor 156A via the communication fabric 204A. In one or more aspects, the SLB and the IUSB are implemented with the one or more other multiple units on the same semiconductor-die or on multiple interconnected dies.

The SMP interconnect 210A is configured to allow additional processors, such as processor 156B through 156N, to be connected to processor 156A, thus increasing computational power. The SMP 210A interconnect may connect processor 156A to the processors 156B through 156N via a fabric bus 212. The fabric bus 212 connection may include a higher bandwidth and provide lower latency. The fabric bus 212 may allow cache coherence traffic and data traffic to flow over a different network connection. In one or more embodiments, the fabric bus 212 may be any type of communication fabric and/or any combination of connections and protocols that allow communication between processors 156A, 156B, through 156N. For the fabric bus 212 may be a bus that interconnects processors 156A, 156B, through 156N.

The communication fabric 204A may be any type of communication fabric known to one of ordinary skill in the art that allows communication between the various units, memory, and interconnects in processor 156A. The communication fabric 204A may also be an out-of-order on-chip bus, in which the transactions (e.g., checkin request/response transactions, checkout request/response transactions, and invalidate transactions) are transmitted as packets on the out-of-order on-chip bus. In one or more embodiments, the one or more cores and/or caches 208A may include one or more processor cores and their level one ("L1") cache, level two ("L2") cache, and/or last level cache ("LLC") on processor 156A. The L1 cache, L2 cache, and LLC may be arranged in an arbitrary configuration. For example, the L1 cache may be a split instruction and data cache, the L2 cache may be a shared cache, and the LLC may be a private cache. In another example, the L1 cache may include L1 Instruction and data caches that are private, the L2 cache may be private or may be shared with another core, and the LLC may be a private or shared cache. The one or more processor cores are configured to read and execute program instructions.

The PMU 206A may be configured to analyze the performance of the processor 156A and the storage of the processor 156A. For example, the PMU 206A may analyze the number of clock cycles and/or cache hits and cache misses.

In one or more embodiments, the processor 156A includes at least one memory management unit (MMU) 216A, an accelerator unit (AU) 214A, and a direct memory access (DMA) controller (not shown). In one or more embodiments, the MMU 216A is a unit on processor 156A that manages memory including facilitating access to the memory by providing address translation. The AU 214A is configured to provide an interface between external processing elements and the elements within the processor 156A, including providing access to locations in RAM 168 on the computer 152, the cores and/or caches 208A on the processor 156A, or other memory locations in or connected to the computer 152. In some embodiments, the AU 214A may include coherent accelerator processor interfaces, graphic acceleration interfaces, cryptographic interfaces, and streaming interfaces. The AU 214A of the processor may be specialized hardware that can perform specific compute functions, such as encryption, decryption, compression, or decompression. The DMA controller may make requests to the cores and/or caches 208A on behalf of the AU 214A. That is, the DMA controller may perform memory moves on behalf of AU 214A.

Address translation in a computer system typically incorporates accessing various address translation data structures. One such structure, referred to as a page table, includes multiple page table entries (PTEs) that map virtualized addresses on a page-by-page basis. The page table is typically stored in main memory, rather than dedicated memory, which makes accessing the page table slow. To accelerate address translation, high-speed memories referred to as TLBs, SLBs, and/or IUSBs are typically used to store recently used address translations in cache entries for quick access.

A TLB may be a cache of virtual addresses mapped to real addresses stored in TLB entries. Each TLB entry may be associated with a TLB index, which identifies the TLB (or a page table entry (PTE)) entry within the TLB. For example, a TLB index of 4 may refer to the fourth (or fifth) entry in the TLB. A variety of indexing schemes, known to those of ordinary skill in the art, may be used for TLB indexes. The SLB may be a cache of effective segment identifiers (ESID) mapped to virtual segment identifiers (VSID) stored in SLB entries. In hash page table translations, a portion of the EA, referred to as the ESID, is used to obtain a VSID, and a combination of the EA and VSID are used to determine a virtual address. Each SLB entry is associated with an SLB index, which identifies the SLB entry within the SLB. For example, a SLB index of 4 may refer to the fourth (or fifth) entry in the SLB. A variety of indexing schemes, known to those of ordinary skill in the art, may be used for SLB indexes. The IUSB (not shown) may be a data structure that stores Effective-to-Real Address Translation (ERAT) indexes mapped to TLB indexes and, if applicable, SLB indexes. The IUSB tracks which entries in the SLB and the TLB store translations that have been utilized to generate translations that are currently stored in one or more caches of processor 156A.

To improve address translation, the MMU 216A utilizes the TLB 202A. The TLB 202A is a cache of effective (virtual) address to real address (RA) translations received from the MMU 216A. The EA is a virtual address used by elements and processes in the system 10 to to memory locations. The RA is a physical address. During operation of the processor 156A, the EA must be translated into the RA in order for the processor 156A to access requested data. When a request is received for a memory access that includes an address to be translated, typically the TLB 202A is checked first. If the address is cached in the TLB 202A, then the address translation is provided to the processor 156A. If the address is not in the TLB 202A, the address is translated using any number of translation techniques including a table walk.

When an address translation, e.g., an address mapping, in a TLB 202A or page table is no longer valid, the system will undergo an invalidation process. More specifically, a TLB invalidate entry (TLBie) instruction is broadcast throughout the system, TLB caches are located, and each entry in the TLB 202A is searched to determine whether it has an entry that matches the entry to be invalidated. The TLBie instruction locates storage (memory) locations where address translations are mapped, which is indicative of data associated with the processor 156A.

In one or more other embodiments, a SLB invalidate entry (SLBie) instruction is broadcast through the system 10 for the cases in which an invalidation operation is applied to a translation in a SLB. In yet one or more other embodiments, an IUSB invalidate entry (IUSBie) instruction is broadcast throughout the system for the cases in which an invalidation operation is applied to a translation in an IUSB. The disclosure describes an example in which a TLBie instruction is broadcast throughout the system 10 to invalidate translations in TLB caches; however, it is noted the features within the TLBie instruction example are equally applicable to embodiments in which a SLBie instruction and/or an IUSBie instruction is broadcast throughout the system 10 to invalidate translations in storage (memory) locations.

In one or more embodiments, the TLBie instruction is used and processed to accumulate information on the location of data within a processor system. In an aspect, the TLBie instruction is issued from a core processor, such as processor 156A, and is marked to return data to the performance monitor unit (PMU), such as PMU 206A, of the core processor. The TLBie instruction is broadcast (e.g., distributed) throughout the system to invalidate any cached copy of the address translation data. Every TLB cache, such as TLB 202B and/or TLB 202N, is searched (e.g., snooped) and if there is a matching entry in the TLB cache, that TLB entry is invalidated. The cache being invalidated accumulates data and returns the data to the issuing processor core. The data collected and returned includes the identity (location) of the processor where the TLB cache was invalidated (e.g., where there was an address translation match), and the accumulated number or total of TLB caches invalidated in the system and/or is returned to the PMU 206A. The issuing processor 156A collects the data and stores it in PMU 206A when the TLBie instruction completes. Software can then be used to access the data stored on the PMU 206A, and the data can be used to improve performance or improve testability of the system.

Figure 3:
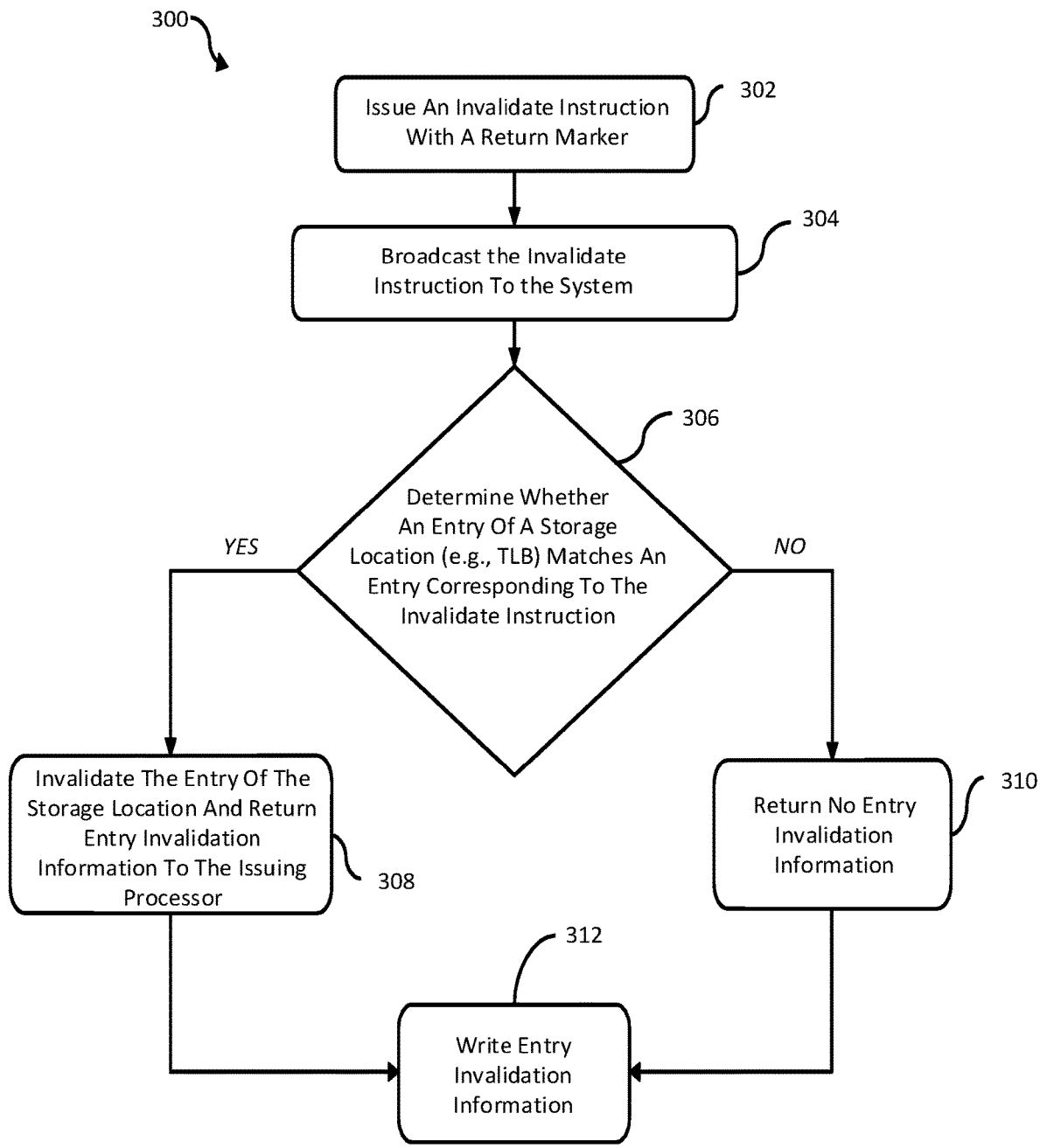
FIG. 3 is a flowchart illustrating a method of identifying the location of data within a computer system to improve performance of one or more processors, according to one or more embodiments of the present disclosure.

FIG. 3 is an exemplary flowchart in accordance with various embodiments illustrating and describing a method of identifying the location of data within a computer system to improve performance of one or more processors, according to one or more embodiments of the present disclosure. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, simultaneously, or the steps may be performed in the order disclosed or in an alternate order.

In one or more embodiments, an invalidate instruction with a return marker is issued at 302, preferably by one of the processors 156A, 156B, through 156N. In one or more embodiments, the invalidate instruction is an instruction to invalidate an address translation, i.e., to invalidate an entry within one or more storage locations, such as a TLB, SLB, IUSB, and/or cache, of the system. In one or more embodiments, the invalidate instruction is a TLBie instruction, which is used to invalidate an entry within one or more TLBs. In one or more embodiments, the invalidate instruction is a SLBie instruction, which is used to invalidate an entry within one or more SLBs. In one or more embodiments, the invalidate instruction is an IUSBie instruction. In one or more embodiments, each of the TLBie instruction, SLBie instruction, and IUSBie instruction can issue with the return marker. The method 300 is described using a TLBie instruction as an example; however, it should be noted that the method 300 is equally applicable for using other instructions, such as a SLBie instruction or IUSBie instruction, to invalidate entries in one or more other storage locations.

The TLBie instruction is used to invalidate one or more copies of the entry in storage locations throughout the system 10, including TLB caches associated with processors other than the processor issuing the TLBie instruction. That is, the TLBie instruction may invalidate any entry cached in a TLB copy that corresponds to the TLB entry that is being invalidated, including processors other than the issuing processor. For example, the processor 156A may issue the TLBie instruction with a return marker. The TLBie instruction, for example, can be used to invalidate a copy of an entry that is cached in the TLB 202B of processor 156B. The return marker may be included with the TLBie instruction. In one or more embodiments, the return marker may indicate to another processor to return data to the processor that issued the TLBie instruction, e.g., the issuing processor. The return marker may also indicate to the other processor to return data to a PMU of the processor that issued the TLBie instruction. For example, the return marker may indicate to another processor, such as processor 156B, to return data to the PMU 206A of processor 156A.

In one or more embodiments, the invalidate instruction (e.g., TLBie instruction) is broadcast, at 304, to the system 10, including one or more storage locations in the system 10. The invalidate instruction is preferably broadcast by the issuing processor, for example, processor 156A. In one or more embodiments, the TLBie instruction is broadcast to invalidate any cached copy of the address translation. The processor 156A in an embodiment broadcasts the invalidate instruction with the return marker to the system including one or more storage locations, e.g., TLB caches, on one or more of the other processors, via the fabric bus 212. For example, processor 156A broadcasts the TLBie instruction with the return marker to the TLB 202B on processor 156B and to the TLB 202N on processor 156N. In one or more embodiments, the processor 156A broadcasts the invalidate instruction with the return marker to one or more locations in which the translation data is cached, for example, the TLB, SLB, IUSB, and/or one or more other caches.

In one or more embodiments, a determination is made at 306 as to whether a storage location entry, e.g., a TLB entry, matches an entry corresponding to the invalidate instruction. In one or more embodiments, the one or more other processors, such as processor 156B and 156N, receive the broadcast invalidate instruction. The one or more units, such as the MMU 216B, AU 214B, and DMA controller, of the receiving processor, such as processor 156B, perform their operations to search (e.g., snoop) one or more storage locations to determine whether an entry in a storage location matches the entry corresponding to the invalidate instruction. That is, one or more caches on one or more processors are searched to determine whether there is an entry in a cache that matches the entry that is invalidated by the invalidate instruction. In an aspect, the TLB caches of the processors in the system are searched and compared to determine whether they have an entry that matches the entry being invalidated by (referenced in) the TLBie instruction. In one or more embodiments, the processor, e.g., processor 156B, receiving the invalidate instruction searches its caches, e.g., caches 208B, and/or buffers, e.g., TLB 202B, to determine whether the processor is storing an entry that corresponds to the TLBie instruction.

For the cases in which a storage location, e.g. TLB cache, has an entry matching the entry corresponding to the invalidate instruction (306: YES), the entry in the storage location, e.g., TLB cache, is invalidated and entry invalidation information is returned at 308 to the issuing processor, and in an embodiment, to the PMU of the issuing processor. In one or more embodiments, in response to determining that an entry in a storage location, e.g., TLB 202B, matches the entry corresponding to the address translation invalidate instruction, i.e., the TLBie instruction, the processor, e.g., processor 156B, invalidates the entry in the TLB 202B. In one or more embodiments, having invalidated the entry, the processor 156B returns information, based on the marker included with the TLBie instruction, to the PMU 206A of the processor 156A. The processor 156B may return the information via the fabric bus 212. In one or more embodiments, the information collected and returned to the issuing processor is predetermined, and in an embodiment includes the location of where the invalidated entry was stored. For example, the collected and returned information may include the identification of the processor that stored the invalidated entry, and/or the storage locations, e.g., TLB caches, that stored the invalidated entry. For cases where no entry of the storage locations, e.g., no TLB entries, match the invalidated entry, i.e., the entry corresponding to the invalidate instruction (306: NO), no entry invalidation information is returned at 310.

In one or more embodiments, after the entry invalidation information is returned at 308, the entry invalidation information is written at 312. In one or more embodiments, the issuing processor 156A collects the returned information from each processor and totals the number of locations in which a cached entry was invalidated. The issuing processor, e.g., processor 156A, and stores (writes) the information returned to the issuing processor, e.g., the identity of the processor where the data was located and the total number of invalidated cached entries, in the PMU 206A.

The one or more embodiments of the present disclosure allows software of a computer to access the data and identify the location of the data on one or more processors. The location of data associated with the address translation invalidation instruction may be determined for any translation invalidation instruction that is executed. Moreover, by knowing the location of the data, a programmer can know how far away the shared data is located from the processor that issued the invalidate instruction and can determine the latency of accessing the location of the shared data.

The one or more embodiments of the present disclosure additionally do not require analyzing a bus trace (i.e., the trace of the activity between one or more processors) and extracting information from the bus trace to determine where the data is located. Moreover, for the cases in which a programmer is attempting to widely distribute translation information, the one or more embodiments of the present disclosure may be used to indicate if the wide distribution of translation information is successful and/or information as to how the translation information is consumed by the programmer's test software.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 3, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in computer-readable memory or storage medium implement an article of manufacture including instructions which implement the functions specified in the flowchart block or blocks.

Accordingly, blocks of the flowchart support means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of processing information in a processor of a computer system includes issuing, from one of a plurality of processors, an address translation invalidation instruction with a return marker. In one or more aspects, the address translation invalidation instruction invalidates one or more address translation entries in one or more storage locations in the computer system. In one or more embodiments, the method includes broadcasting the address translation invalidation instruction to one or more storage locations of one or more of the other processors. In one or more embodiments, the method includes invalidating an address translation entry located in a storage location of the one or more storage locations. In one or more embodiments, the method includes returning information on the invalidated address translation entry to the issuing processor.

In one or more embodiments, a computer program product includes a non-transitory computer-readable storage medium having program instructions embodied thereon. In one or more aspects, the program instructions are executable by one or more processors. The program instructions, in one or more embodiments, when executed by a processor cause an address translation invalidation instruction with a return marker to issue from an issuing processor. In one or more aspects, the address translation invalidation instruction invalidates one or more address translation entries in one or more storage locations in the computer system. The program instructions, in one or more embodiments, include instructions that when executed by a processor cause the address translation invalidation instruction to be broadcast to one or more storage locations of one or more of the other processors. The program instructions, in one or more embodiments, include instructions that when executed by a processor cause an address entry located in a storage location of the one or more storage locations to be invalidated. The program instructions, in one or more embodiments, include instructions that when executed by a processor cause information on the invalidated address translation entry to be returned to the issuing processor.

In one or more embodiments, an information handling system comprises one or more processors. In one or more embodiments, one of the one or more processors is configured to issue an address translation invalidation instruction with a return marker. In one or more embodiments, the address translation invalidation instruction invalidates one or more address translation entries in one or more storage locations in the computer system. In one or more embodiments, the processor is further configured to broadcast the address translation invalidation instruction to one or more storage locations of one or more of the other processors. In one or more embodiments, one or more of the other processors is/are configured to invalidate an address translation entry located in a storage location of the one or more storage locations. In one or more embodiments, the one or more of the other processors is further configured to return information on the invalidated address translation entry to the issuing processor.

One or more embodiments of the present disclosure may be a system, a method, and/or a computer program product. The computer program product may include a computer readable storage medium (or media) having computer readable program instructions thereon for causing a processor to implement aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing information in a computer system having a plurality of processors, the method comprising:
   issuing, from an issuing processor of the plurality of processors, an address translation invalidation instruction with a return marker, wherein the address translation invalidation instruction is to invalidate one or more address translation entries in one or more address translation buffers in the computer system, and wherein the return marker comprises an instruction to return information to the issuing processor indicating the identity of each processor that has one or more address translation buffers that contain one or more address translation entries that correspond to an address of the address translation invalidation instruction;
   broadcasting the address translation invalidation instruction with the return marker to the one or more address translation buffers of one or more of the processors other than the issuing processor;
   invalidating an address translation entry located in the one or more address translation buffers in the computer system; and
   returning information to the issuing processor on the identity of each processor that has one or more of the invalidated address translation entries in the one or more address translation buffers.

2. The method of claim 1, further comprising:
   determining whether an address translation entry in the one or more address translation buffers matches the address corresponding to the address translation invalidate instruction.

3. The method of claim 2, wherein in response to determining that an address translation entry in the one or more address translation buffers matches the address corresponding to the address translation invalidation instruction, the matching address translation entry in the one or more address translation buffers is invalidated.

4. The method of claim 1, further comprising:
   collecting information on the invalidated address translation entry, and returning the collected information to the issuing processor.

5. The method of claim 1 further comprising:
   collects the information returned to the issuing processor in a performance monitoring unit of the issuing processor.

6. The method of claim 1, wherein the return marker comprises an instruction for the one or more other processors to return predetermined information to the issuing processor.

7. The method of claim 6, wherein the predetermined information comprises the total number of address translation entries in the one or more address translation buffers that were invalidated by the address translation invalidation instruction.

8. The method of claim 1, further comprising accessing the returned information.

9. The method of claim 1, wherein the one or more address translation buffers in the computer system comprises one or more caches of address translation entries.

10. The method of claim 9, wherein the one or more caches comprises a translation lookaside buffer associated with one or more of the plurality of processors.

11. A computer program product comprising:
   a non-transitory computer-readable storage medium having program instructions embodied therewith, the program instructions executable by one or more processors on a computing system, the program instructions when executed by the one or more processors on the computing system cause the computing system to:
      issue, from an issuing processor of the one or more processors, an address translation invalidation instruction with a return marker, wherein the address translation invalidation instruction is to invalidate one or more address translation entries in one or more address translation buffers in the computer system, and wherein the return marker comprises an instruction to return information to the issuing processor indicating the identity of each processor that has one or more address translation buffers that contains an address translation entry that corresponds to an address of the address translation invalidation instruction;
      broadcast the address translation invalidation instruction with the return marker to one or more address translation buffers of the one or more processors other than the issuing processor;
      invalidate an address translation entry located in one or more of the address translation buffers in the computer system; and
      return information to the issuing processor on the identity of the one or more processors that has one or more of the invalidated address translation entries in the one or more address translation buffers.

12. The computer program product of claim 11, wherein the program instructions when executed by the one or more processors on the computing system cause the computing system to determine whether an address translation entry in the one or more one or more address translation buffers matches the address corresponding to the address translation invalidate instruction.

13. The computer program product of claim 12, wherein in response to determining that an address translation entry in the one or more address translation buffers matches the address corresponding to the address translation invalidation instruction, each of the matching address translation entries in the one or more address translation buffers is invalidated.

14. The computer program product of claim 11, wherein the program instructions when executed by the one or more processors of the computing system cause the computing system to collect information on the invalidated address translation entry, and return to the issuing processor the information collected on each invalidated address translation entry to the issuing processor.

15. The computer program product of claim 11, wherein the program instructions further include collecting the information returned to the issuing processor in a performance monitoring unit of the issuing processor.

16. The computer program product of claim 11, wherein the return marker comprises an instruction for the one or more other processors to return predetermined information to the issuing processor.

17. The computer program product of claim 16, wherein the predetermined information comprises information indicating the total number of address translation entries in the one or more address translation buffers that were invalidated by the address translation invalidation instruction.

18. An information handling system comprising one or more processors,
   wherein one of the one or more processors is an issuing processor where the issuing processor is configured to:
      issue an address translation invalidation instruction with a return marker, wherein the address translation invalidation instruction is to invalidate one or more address translation entries in one or more address translation buffers in the information handling system, and wherein the return marker comprises an instruction to return information to the issuing processor indicating the identity of each processor that has one or more address translation buffers that contain an address translation entry that corresponds to an address of the address translation invalidation instruction; and
      broadcast the address translation invalidation instruction with the return marker to one or more address translation buffers of the one or more processors other than the issuing processor, and
   wherein the one or more processors other than the issuing processor are configured to:
      invalidate an address translation entry located in one or more of the address translation buffers of the one or more processors other than the issuing processor; and
      return information to the issuing processor on the identity of the one or more processors other than the issuing processor that has one or more of the invalidated address translation entries in the one or more address translation buffers.

19. The information handling system of claim 18, wherein the one or more other processors are further configured to determine whether an address in the one or more address translation entries in the one or more address translation buffers matches the address in the address translation invalidate instruction.

20. The information handling system of claim 18, wherein the return marker further comprises the total number of address translation entries in the one or more address translation buffers that were invalidated by the address translation invalidation instruction.

* * * * *